United States Patent [19]
Asada

[11] Patent Number: 5,719,485
[45] Date of Patent: Feb. 17, 1998

[54] VOLTAGE REGULATOR OF VEHICLE ALTERNATOR

[75] Inventor: Tadatoshi Asada, Anjo, Japan

[73] Assignee: Nippondenso Co., Ltd., Kariya, Japan

[21] Appl. No.: 627,477

[22] Filed: Apr. 4, 1996

[30] Foreign Application Priority Data

Apr. 28, 1995 [JP] Japan ................... 7-106431
Dec. 7, 1995 [JP] Japan ................... 7-319381

[51] Int. Cl.[6] ........................... H02J 7/14
[52] U.S. Cl. .................. 322/28; 322/24; 322/99
[58] Field of Search ................ 322/28, 25, 26, 322/27

[56] References Cited

U.S. PATENT DOCUMENTS

| | | | |
|---|---|---|---|
| 5,122,723 | 6/1992 | Sato | 320/64 |
| 5,210,480 | 5/1993 | Iwatani et al. | 322/28 |
| 5,418,401 | 5/1995 | Kaneyuki | 307/10.1 |
| 5,483,146 | 1/1996 | Schultz et al. | 322/7 |
| 5,512,813 | 4/1996 | Uchinami | 322/28 |
| 5,581,172 | 12/1996 | Iwatani et al. | 322/28 |

FOREIGN PATENT DOCUMENTS

| | | |
|---|---|---|
| 63-262033 | 10/1988 | Japan. |
| 1-027401 | 8/1989 | Japan. |
| 5-268733 | 10/1993 | Japan. |
| 6-011170 | 2/1994 | Japan. |
| 6-081431 | 10/1994 | Japan. |

Primary Examiner—Steven L. Stephan
Assistant Examiner—Nicholas Ponomarenko
Attorney, Agent, or Firm—Cushman, Darby & Cushman IP Group of Pillsbury, Madison & Sutro LLP

[57] ABSTRACT

A control voltage setting circuit 31 provides one of a pair of control voltages when one of a pair of command signals are transmitted from an upper control unit 4 which is disposed outside the alternator. The command signals correspond respectively to upper and lower desired output voltages of the alternator. A voltage regulation circuit 32 makes the alternator provide an alternator output voltage according to one of the control signal. When a pair of the command signals are generated alternately at a cycle shorter than a cycle decided by the response time of the alternator, the control voltage setting circuit 31 provides an alternating control signal so that the alternator 2 generates a middle voltage between the upper and lower desired voltages.

19 Claims, 15 Drawing Sheets

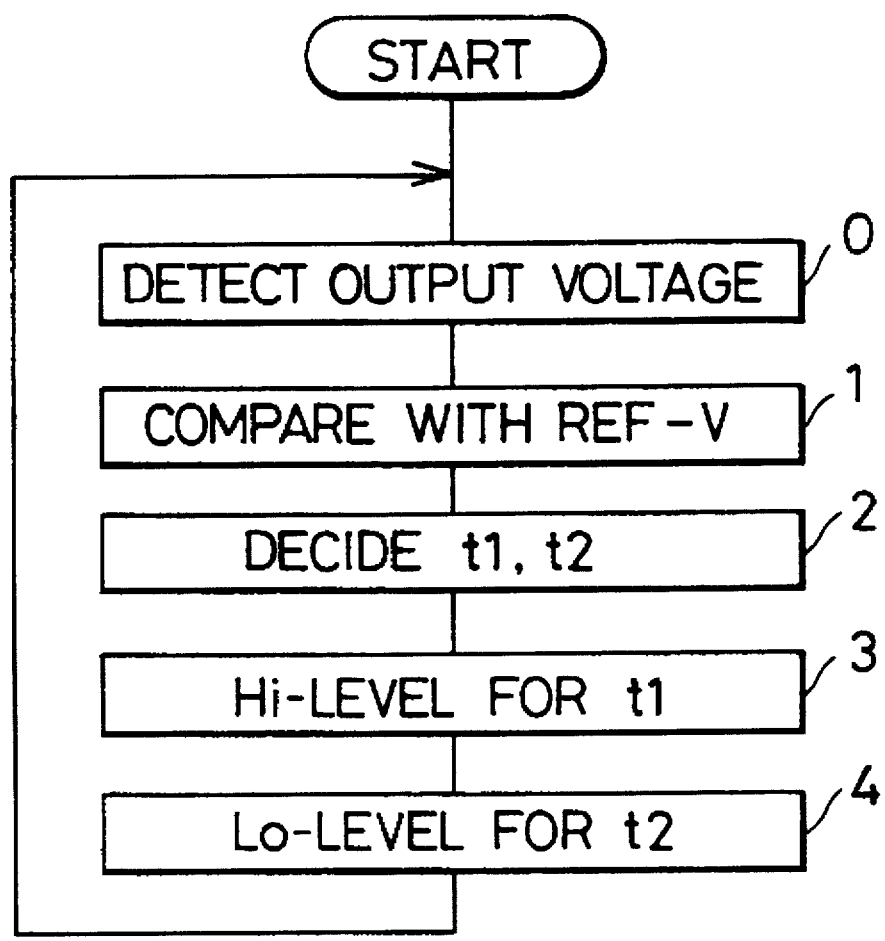

FIG. 3A (43) ON OFF ON OFF ON OFF
FIG. 3B (30) Lo Hi Lo Hi Lo Hi
FIG. 3C (P) VHi VLo VHi VLo VHi VLo
FIG. 3D (323) ON OFF ON OFF ON OFF
FIG. 3E (2)
FIG. 4A
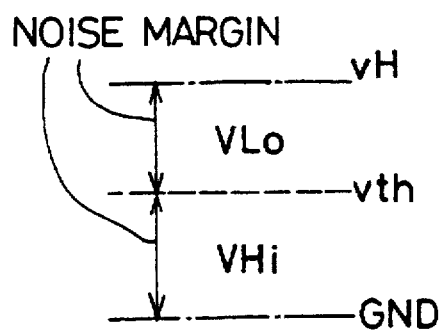
FIG. 4B
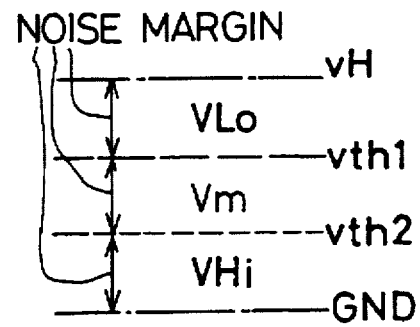

VOLTAGE REGULATOR OF VEHICLE ALTERNATOR

CROSS REFERENCE TO RELATED APPLICATION

The present application is based on and claims priority from Japanese Patent Applications Hei 7-106431 filed on Apr. 28, 1995 and Hei 7-319381 filed on Dec. 7, 1995, the contents of which are incorporated herein by reference.

BACKGROUND OF THE INVENTION

1. Field of the Invention

The present invention relates to a voltage regulator for a vehicle which provides a plurality of regulated output voltages according to command signals.

2. Description of the Related Art

There is an alternator for a vehicle which generates a plurality of levels of voltage according to vehicle conditions.

That is, when a vehicle is accelerated, the alternator generation is intentionally stopped to reduce the torque required to rotate the generator, thereby facilitating the vehicle acceleration. When the battery is normally charged, the output power is regulated not to charge the battery any more, thereby reducing the torque to reduce the fuel consumption. When the vehicle is decelerated, the output voltage is increased to charge the battery so that the kinetic energy of the vehicle can be regenerated during the deceleration. When a high power load such as a windshield heater is powered, voltage higher than the battery charging voltage is generated.

JP-U-1 27401 and JP-A-5 268733 disclose voltage regulators for vehicles in which control voltages are set to correspond to required output voltages, which are regulated by the voltage regulators according to the respective control voltages.

However, in such a regulator where the control voltages are set according to the required output voltages, when the number of necessary voltages is increased, the number of control voltages increases necessarily. It is, therefore, necessary to discriminate accurately the respective control voltages corresponding to the required output voltages. However, the more the number of information signals or control signals is increased, the less the noise margin becomes, resulting in malfunction of the regulator. In order to ensure stable operation of the regulator, it is, therefore, necessary to provide highly accurate signal sensors for discriminating the command signals, resulting in an expensive device or, otherwise, a limited number of the alternator output voltages. In such a voltage regulator, one of the command signals is supplied from the outside to command the alternator to generate a required alternator output voltage, and the command signal is converted into a control voltage which corresponds to the required output voltage. Therefore, the regulator of the alternator requires a complicated structure for converting the command signals from the outside signals, thereby resulting in an expensive device.

SUMMARY OF THE INVENTION

The present invention has an object of providing an inexpensive and reliable alternator having a simple and reliable voltage regulator which generates a plurality of output voltages, and which can generate normal output voltage with an internal reference voltage or self-controlled voltage even when a command-signal-communication-line is disconnected.

Another object of the present invention is to provide a voltage regulator of an alternator including control voltage setting means for selectively setting control voltages when a command signal is transmitted from outside, voltage regulating means for controlling the alternator field current to regulate the alternator output voltage to one of set voltages, command signal generating means for transmitting the command signal to the control voltage setting means, wherein the command signal generating means comprises middle voltage setting means for setting the alternator output voltage to a voltage between the set output voltages, voltage detecting means for detecting the alternator output voltage, and control-signal switching control means for comparing a detected voltage of the voltage detecting means with a voltage corresponding to the middle output voltage and changing over from one to the other alternately between the first command signal and the second command signal.

The control voltage setting means generates a first control voltage or a second control voltage when a first command signal or a second command signal is transmitted from outside.

At this time, the voltage regulating means changes the field current according to the first and second control voltage to change the alternator output voltage. Since the first command signal and the second command signal are alternately changed by feedback control, the first control voltage and the second control voltage are alternately generated to turn on or off the field current so that the alternator output voltage is regulated between the first output voltage and the second output voltage.

Thus, since two control voltages are generated to correspond to the two command signals, the alternator output voltage can be regulated to the first output voltage, second output voltage and middle voltage between the first and second output voltages.

Accordingly, a circuit which only discriminates two command signals is enough to provide more than two alternator output voltages, so that the control voltage setting means and voltage regulating means can be made simple and reliable at a low cost without detection-error of the command signals. In addition, since the operation of the voltage regulating means can be detected, accuracy of the output voltage is ensured, resulting in stable operation without fluctuation of the voltage applied to the electric load caused by feedback control and temperature change.

Since the command signal is changed over from one to the other alternately between the first command signal and the second command signal at a cycle shorter than a cycle which the alternator output voltage can respond, the alternator output voltage reliably becomes a middle voltage between the first and second output voltages.

The shorter the changeover cycle becomes, in comparison to the cycle of the response time of the alternator which is decided by an inductance of the field coil of the alternator, the less fluctuation of the alternator output voltage can be attained, resulting in improvement of the alternator performance.

When the cycle of changing over from one to the other alternately between the first command signal and the second command signal is set constant, the alternator output voltage can be detected accurately, so that gradual change of the voltage and the feedback control can be carried out easily. As a result, a simple detector can be used and the command signal generating means can be made simple. In addition, a simple detector can be used for detecting the conducting ratio (on-off ratio of switching means) of the field coil of the alternator.

Thus, the constant changeover cycle makes the structure simple and the device inexpensive.

When the changeover time ratio of the control-signal switching control means is changed to regulate the alternator output voltage, a voltage can be also set to the middle output voltage. Accordingly, it is not necessary to increase the number of control voltages, resulting in simple and inexpensive voltage regulating means.

When the changing-over time ratio of the control-signal switching control means is changed step by step, the alternator output voltage is changed gradually so that the torque is not applied to the engine abruptly. As a result, engine stop or hunting can be prevented, thereby providing a simple engine control at a low cost.

The first control voltage and the second control voltage are set so that a vehicle battery may not excessively discharge. Therefore, the battery can be prevented from being dead.

Further, when the alternator voltage is detected to be abnormal, a self-controlled voltage is set to control the alternator to generate a self-controlled output voltage. Thus, when an output voltage is detected different from the command signal transmitted from the command signal generating means due to an abnormality on a line between the command signal generating means and the voltage regulating means, the alternator output voltage becomes a self-controlled output voltage, thereby ensuring a minimum necessary generation. As a result, abnormal output voltage may not be generated so that an electric load can be protected from trouble.

In addition, when transmission of the command signal is restored, abrupt change of the alternator output voltage is reduced so that the electric loads can be protected.

Since simple voltage or current signals are used as the first command signal and the second command signal, the voltage regulating means can be made simple as compared with a device using a complicated signal such as a duty ratio signal or a frequency signal.

A further object of the present invention is to provide a voltage regulator of a vehicle alternator driven by a vehicle engine including control voltage setting means for selecting and setting one of first, second and third control voltages when a first command signal is transmitted from outside, voltage regulating means for controlling field current of the alternator according to the control voltages, and command signal generating means for setting the alternator output voltage and transmitting the first command signal or the second command signal or the third command signal to the control voltage setting means, wherein the command signal generating means comprises middle output voltage setting means for setting the alternator output voltage to a middle voltage between two of the first, second and third output voltages, voltage detecting means for detecting the alternator output voltage, and control-signal switching control means for comparing detected voltage of the voltage detecting means with voltage corresponding to the middle voltage and changing over from one to the other alternately between two of the first, second and third command signals.

The control voltage setting means sets one of first, second and third control voltages which is not provided for battery charging. Accordingly, when a third command signal is transmitted according to the vehicle running state or the electric load condition from the command signal generating means to the control voltage setting means, the control voltage setting means selectively sets the third control voltage corresponding to the third command signal, and the voltage regulating means regulates the alternator output voltage to the third output voltage by generation control.

Since the command signal generating means with a simple structure discriminates the first command signal, the second command signal or the third command signal which does not charge the battery so as to control generation according to the condition of the electric loads, an inexpensive and reliable device with very few detection errors is provided.

In addition, the command signal generating means detects the alternator output voltage and transmits any two of the first control voltage, the second control voltage and the third control voltage to control the alternator output voltage to a middle output voltage. Therefore, the alternator output voltage can be regulated to a voltage between the two output voltages to comply with various demands. That is, various output voltages can be provided with a simple circuit structure.

When the third command signal is transmitted from the command signal generating means to the control voltage setting means, the control voltage setting means provides a control voltage to stop generation of the alternator. Accordingly, the alternator stops generation to reduce the torque required for the power generation, resulting in increase of the vehicle acceleration.

When the third command signal is transmitted from the command signal generating means to the control voltage setting means, the control voltage setting means may provide the third command signal to control the alternator to generate a high output voltage which is supplied to a high power load. As a result, the alternator output voltage becomes the high voltage required to be supplied to the high power load. Therefore, when the alternator is demanded to supply the high output power to a high power load, the alternator output voltage becomes high voltage so that sufficient power can be supplied to the high power load.

When the alternator output voltage set by the command signal generating means is the third output voltage between the first and second output voltages, the command signal generating means alternately generates the first command signal and the second command signal thereby to transmit the third command signal. At the same time, the voltage regulating means detects the alternator output voltage and controls the alternator field current according to the first control voltage and the second control voltage. Since the alternator field current changes with delay due to inductances of the field coil or the like, the output voltage generated in response to the first and second control voltages becomes a middle output voltage which is proportional to the set period of the respective control voltage.

Since two control voltages are set so that the two output voltages are generated in response to the two command signals in the voltage regulating means, the alternator output voltage can be regulated to either one of the first output voltage, second output voltage and the middle output voltage between the first and second output voltages. As a result, a circuit which can only discriminate the two command signals transmitted from the command signal generating means is necessary to regulate the alternator output voltage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 2 is a flow chart showing operation of an upper control unit according to the first embodiment of the present invention;

FIGS. 3A, 3B, 3C, 3D and 3E are time charts showing signals of main portions of the regulator according to the first embodiment of the present invention;

FIGS. 4A and 4B are graphs showing relationships between command signals and threshold voltages of the first embodiment and a sample;

DETAILED DESCRIPTION OF THE PREFERRED EMBODIMENTS

Preferred embodiments of the present invention will be described with reference to appended drawings.

Figure 1:
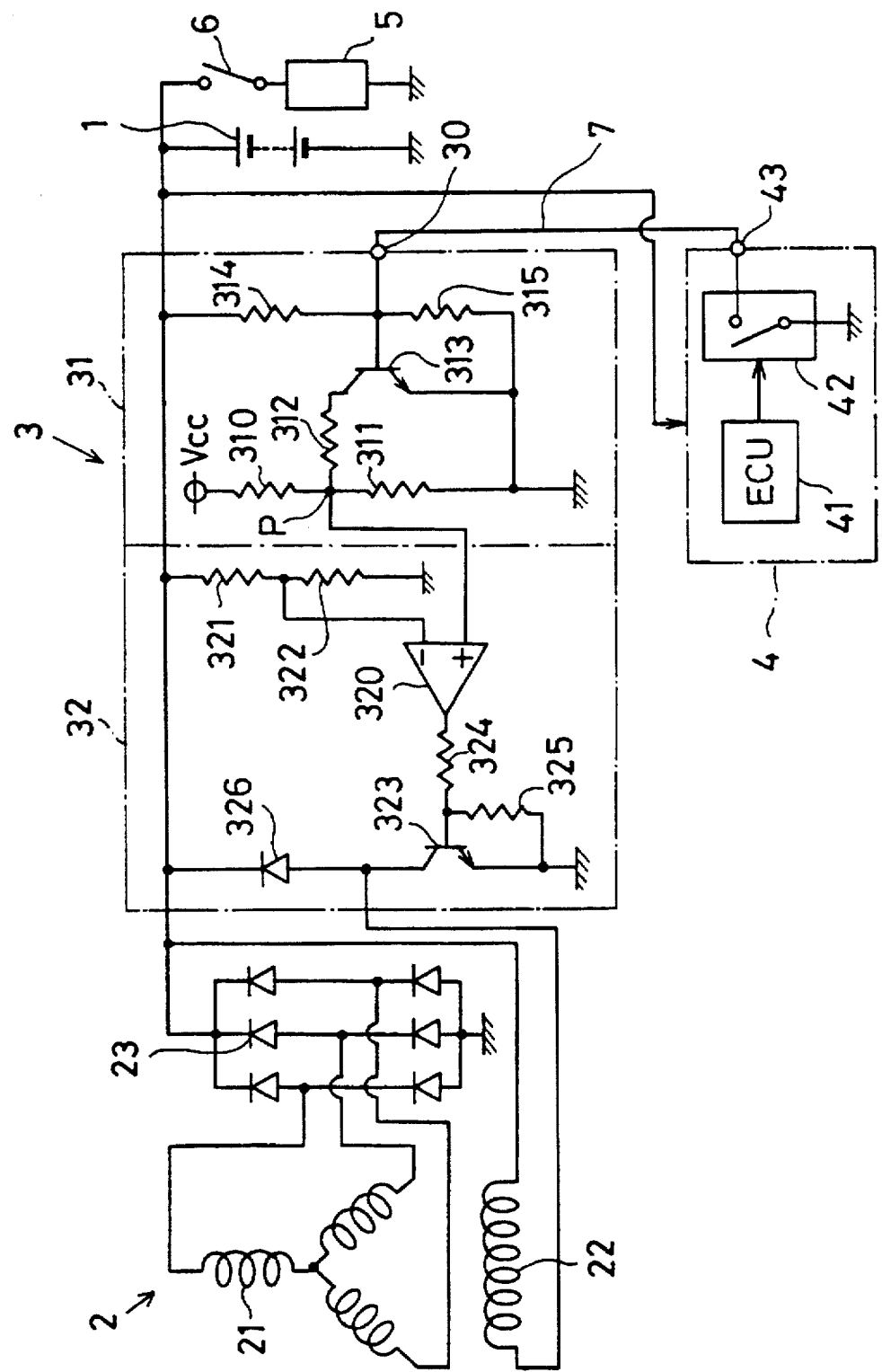
FIG. 1 is a circuit diagram of a voltage regulator and a vehicle alternator according to a first embodiment of the present invention.

In a voltage regulator of an alternator for a vehicle according to a first embodiment shown in FIG. 1, a vehicle battery 1 is connected to a three-phase alternator 2 which is installed in a vehicle and driven by an engine. The alternator is composed of an armature winding 21, a field coil 22, and a three-phase full-wave rectifier unit 23. A generation control unit 3 is connected between the battery 1 and the alternator 2 to turn on or off field current supplied to the field coil 22 of the alternator 2 according to a command signal applied to a terminal 30. An upper control unit 4 is disposed outside the alternator 2 to transmit the command signal to the generation control unit 3. The upper control unit 4 has an ECU 41 and a signal generating circuit 42. An electric load 5 is connected to the battery through a switch 6. The upper control unit 4 and the generation control unit 3 are connected through a communication line 7.

The generation control unit 3 is composed of a control voltage setting circuit 31 and a voltage regulation circuit 32. The control voltage setting circuit 31 generates control voltages to turn on and off the voltage regulation circuit 32 in a control manner to supply controlled current to the field coil 22 of the alternator 2. A flywheel diode 326 is connected across the field coil 22.

In the control voltage setting circuit 31, a voltage Vcc of a constant voltage source is divided by a dividing circuit composed of resistors 310 and 311 to provide one of the control voltages to regulate the output voltage of the alternator 2. The resistor 311 is connected in parallel with a switching circuit having a resistor 312 and a transistor 313. Thus, the voltage dividing circuit can provide two level control voltages at a junction P of the resistors 310 and 311. When a command signal is sent from the upper control unit 4, the transistor 313 is turned on and the voltage of the junction P decreases. When the transistor 313 is turned off, a first control voltage v1 is set at the junction P so that the output voltage of the alternator 2 generates a high voltage VHi (e.g. 16.0 V), and when the transistor 313 is turned on, a second control voltage v2 is set so that the alternator 2 generates a low voltage VLo (e.g. 14.5 V). The first control voltage v1 is provided when the alternator is required to generate an output voltage for the power regeneration for charging a battery, and the second control voltage v2 is provided when the alternator is required to generate an output voltage for normal battery charging. Bias resistors 314 and 315 are connected to the base of the transistor 313.

In the voltage regulation circuit 32, the control voltage provided by the control voltage setting circuit 31 is applied to a positive terminal of a comparator 320 and a portion of the alternator output voltage divided by the resistor 321 and 322 is applied to a negative terminal of the comparator 320. The output terminal of the comparator is connected to the base of a switching transistor 323 and a resistor 325 through a resistor 324. These voltages are compared by the comparator 320 to obtain discrimination signals, which turn on and off the switching transistor 323 to control field current to be supplied to the field coil 22. Thus, the output voltage becomes VHi (16.0 V) or VLo (14.5 V) according to the control voltages v1 or v2.

Because the control voltages v1 and v2 are generated alternately at a cycle which is shorter than the cycle decided by the response time of the alternator, the field current passing through the flywheel diode 326 can not follow the alternating cycle of the control voltages v1 and v2, so that the output voltage of the alternator 2 becomes a voltage (hereinafter referred to as the middle voltage) Vm between the high voltage VHi and the low voltage VLo. The level of the middle voltage Vm is decided by a ratio of time period between the control voltages v1 and v2.

The middle voltage Vm, if it is set to 15 V, can be used to facilitate battery charge when the battery is cold.

In the generation control unit 3 with the structure described above, the alternator 2 generates the output voltage according to the control voltage which is applied to the terminal 30.

In case the voltage level of the terminal 30 is higher than a threshold voltage vth of the transistor 313, the alternator 2 generates the low voltage (14.5 V). In case the voltage level of the terminal 30 is lower than the threshold voltage vth, the alternator 2 generates the high voltage (16.0), in case that the voltage level of the terminal 30 alternately becomes higher or lower than the threshold voltage vth, the alternator 2 generates the middle voltage Vm.

In the upper control unit 4, the ECU 41 controls the engine according to vehicle conditions such as the output voltage of the alternator 2, engine rotational speed, engine load, vehicle acceleration and deceleration, and the signal generating circuit 42 generates the command signals to be applied to a generation control terminal 43.

In order to make the alternator 2 generate the high voltage VHi, the ECU 41 sends a Hi level signal to the signal generating circuit 42, which turns on the switching element to ground the generation control terminal 43. In order to generate the low level voltage, the ECU 41 sends a Lo level signal to the signal generating circuit 42, which turns off the switching element and the generation control terminal 43 becomes open.

The middle voltage Vm is generated in a process shown in FIG. 2. The ECU 41 detects the output voltage V of the alternator 2 in a step 0, compares the alternator output voltage with a reference voltage which is set according to the vehicle conditions such as the engine rotational speed N, engine load Q, vehicle acceleration or deceleration, and the like, in a step 1, determines on-time t1 and off-time t2 of the switching element based on the adore comparison in a step 2, provides the Hi-level signal during the on-time t1 in a step 3, provides the Lo-level signal during the off-time t2 in a step 4, and repeats the above steps while changing the time ratio of the Hi-level signal and Lo-level signal through a feedback control and changing the Hi-level signal and the Lo-level signal alternately in a short cycle. Thus, the on-off signals changing in a short cycle is generated by the switching element of the signal generating circuit 42.

In this embodiment, the cycle (for example, about 20 ms) of the on-off-signal is set shorter than a half of a cycle (100 ms) determined by the time constant of the alternator, and the time ratio r of the on-time t1 to the on-off time, that is, t1/(t1+t2), is set by comparison of the output voltage of the alternator 2 with the reference voltage which corresponds to the middle voltage Vm. When the output voltage is lower than the reference voltage, the time ratio r of the on-time t1 is increased, and when higher, on the other hand, the time ratio r is decreased.

FIGS. 3A, 3B, 3C, 3D and 3E shows signals appearing on the respective portions of the generating circuit 3 when the feedback control is carried out.

It is clear that the output voltage of the alternator 2 is controlled within a deviation range ΔV of the middle voltage Vm.

As described above, the generation control unit 3 switches the output voltage of the alternator 2 from the high voltage VHi to the low voltage VLo or from the low voltage to the high voltage according to the on-signal and the off-signal of the signal generating circuit 42 which are the command signals of the upper control unit 4. In the control voltage setting circuit 31, a threshold voltage vth of the transistor 313 corresponding to a maximum voltage vH is set to discriminate the on-signal and the off-signal of the signal generating circuit 42, which are applied to the terminal 30. For example, as shown in FIG. 4A, the two control voltages are compared with the threshold voltage vth, so that the noise margin to the outside noise can be enlarged, resulting in stable operation.

In the control voltage setting circuit 31, if an attempt is made to discriminate the voltage level of the command signals corresponding to the high voltage VHi, the low voltage VLo and the middle voltage Vm which are the output voltages of the alternator 2, two threshold levels vth1 and vth2 must be set to compare with the maximum voltage vH, which is applied to the terminal 30 as shown in FIG. 4B, to discriminate three level voltages, that is, voltages higher, lower and middle between the threshold voltages vth1 and vth2 respectively. In this case, since the noise margin to the outside noise is not as good as the former, a stable operation in response to the command signals of the upper control unit 4 is not ensured without providing complicated structure, resulting in an increased cost with an increased number of command signals.

Figure 5:
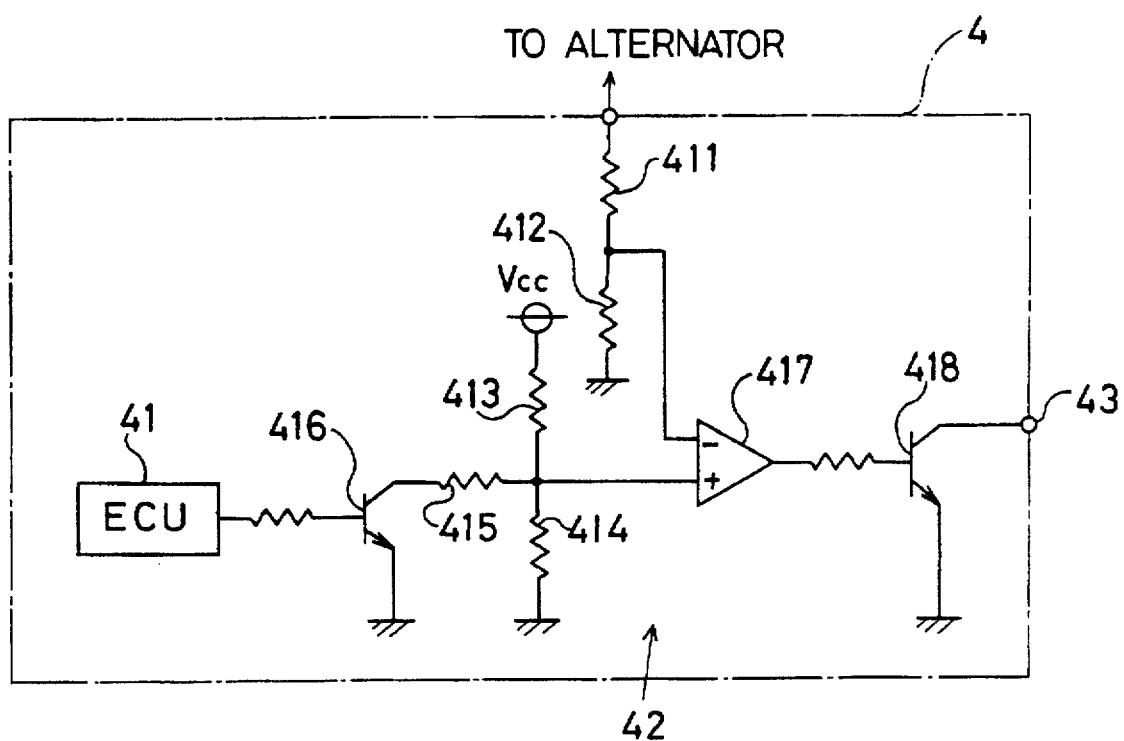
FIG. 5 is of a circuit diagram of the upper control unit according to a second embodiment of the present invention.
Figure 6:
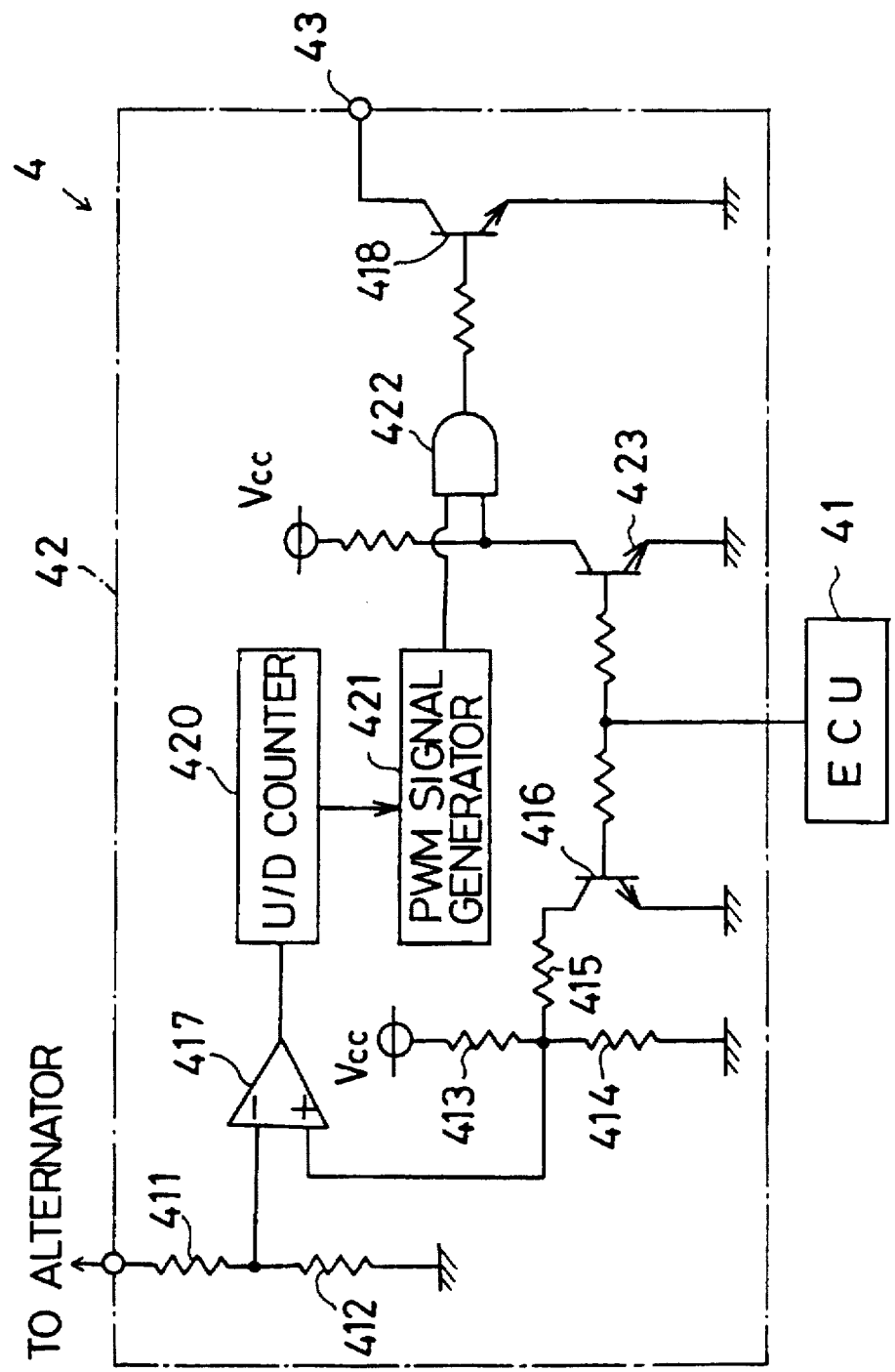
FIG. 6 is a circuit diagram of the upper control unit according to a third embodiment of the present invention.

A second embodiment according to the present invention is described with reference to FIG. 5.

In the second embodiment, a portion of the process of the ECU 41 is replaced by an analog control process. That is, the signal generating circuit 42 of the upper control unit 4 is composed of a detecting-circuit of the alternator output voltage having resistors 411 and 412, a reference voltage circuit having resistors 413, 414, and 415 and a transistor 416 for switching constant voltage Vcc of the constant voltage source according to output voltage of the ECU 41. The command signals are adjusted according to comparison of the divided voltage of the alternator output voltage with the reference voltage by a comparator 417, and are applied to a generation control terminal 43 through a transistor 418 which is a switching element of the signal generating circuit 42.

That is, the transistor 416 is turned on by the ECU 41 to provide the control voltage setting circuit 31 with a reference voltage which corresponds to the middle voltage Vm of the alternator 2. The switching transistor 418 is not controlled by the ECU 41 directly, but on-off-controlled by the output signal of the comparator 417.

When the output voltage of the alternator 2 is lower than the reference voltage, the comparator 417 applies the Hi-level signal to the base of the transistor 418 to turn on the transistor 418. Then, the terminal 30 is grounded, the control voltage setting circuit 31 provides first control voltage v1, the voltage regulating circuit 32 increases the control voltage to make the alternator output voltage the high voltage VHi. When, on the other hand, the output voltage of the alternator 2 is higher than the reference voltage, the comparator 417 applies the Lo-level signal to the base of the switching transistor 418 to make the voltage of the terminal 30 the Hi-level so that the control voltage setting circuit 31 provides second control voltage v2 to lower the alternator output voltage.

Thus, the first control voltage v1 and the second control voltage v2 are alternately provided according to the comparison between the reference voltage corresponding to the middle voltage Vm and the alternator output voltage in the course of feedback control, so that the output voltage of the alternator 2 is adjusted to the middle voltage Vm.

A third embodiment according to the present invention is described with reference to FIG. 6 and FIGS. 7A, 7B, 7C, 7D and 7E.

In the third embodiment, if a demand of changing the output voltage of the alternator 2 is given to the ECU 41 of the upper control unit 4, the command signal applied to the generation control unit 3 is not changed rapidly, but changed gradually from the former output voltage to the demanded output voltage.

In this embodiment, the signal generating circuit 42 has an up-down counter 420 (hereinafter referred to as the U/D counter), a PWM-signal (pulse width modulation signal) generator 421 for generating PWM signals having pulse width corresponding to a number counted by the U/D counter 420 and art AND circuit 422 which are connected to the subsequent stage of the comparator 417 and a transistor 423 controlled by the ECU 41.

When the output voltage of the alternator 2 is compared by the comparator 417 and decided to be lower than a set output voltage, the U/D counter 420 counts down to reduce the duty ratio of the Hi-level PWM signal by the PWM signal generator 421.

The transistor 423 turns on and off according to the signals generated by the ECU 41. The Lo-level signal is applied by the ECU 41 to the transistor 423 in order to generate the high output voltage VHi and the Hi-level signal is applied to the transistor 423 in order to generate the low voltage VLo.

Figure 7:
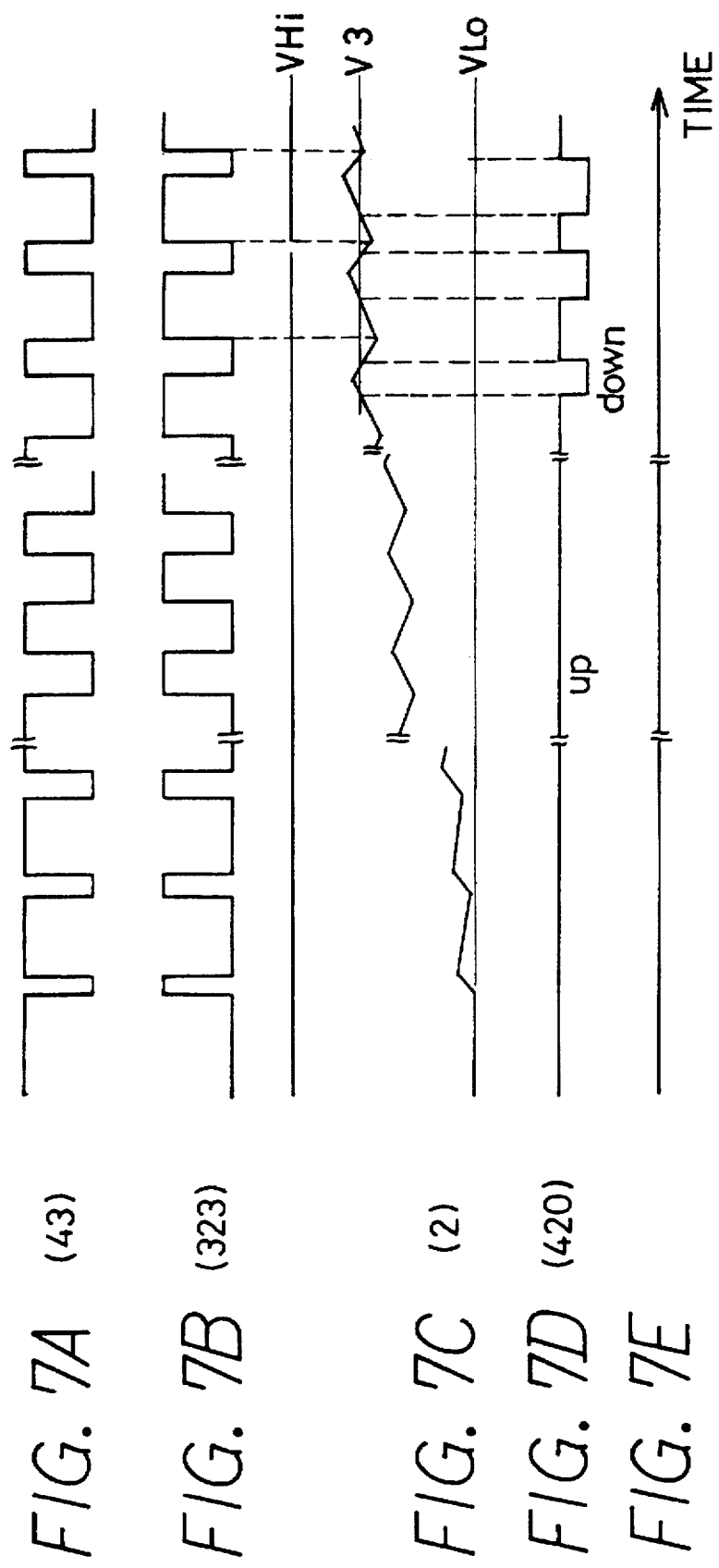
FIGS. 7A, 7B, 7C, 7D and 7E are time charts showing signals of main portions of the regulator according to the third embodiment of the present invention.

As a result, even if the signal is generated by the ECU 41 in order to generate a set output voltage, the command signal sent from the transistor 418 is modified by the PWM signal so that the alternator output voltage gradually changes to the set output voltage in response to the counting of the U/D counter 420 until the alternator output voltage becomes equal to the reference voltage and the U/D counter 420 stops counting as shown in FIG. 7D because priority is given to the PWM signal.

Figure 8:
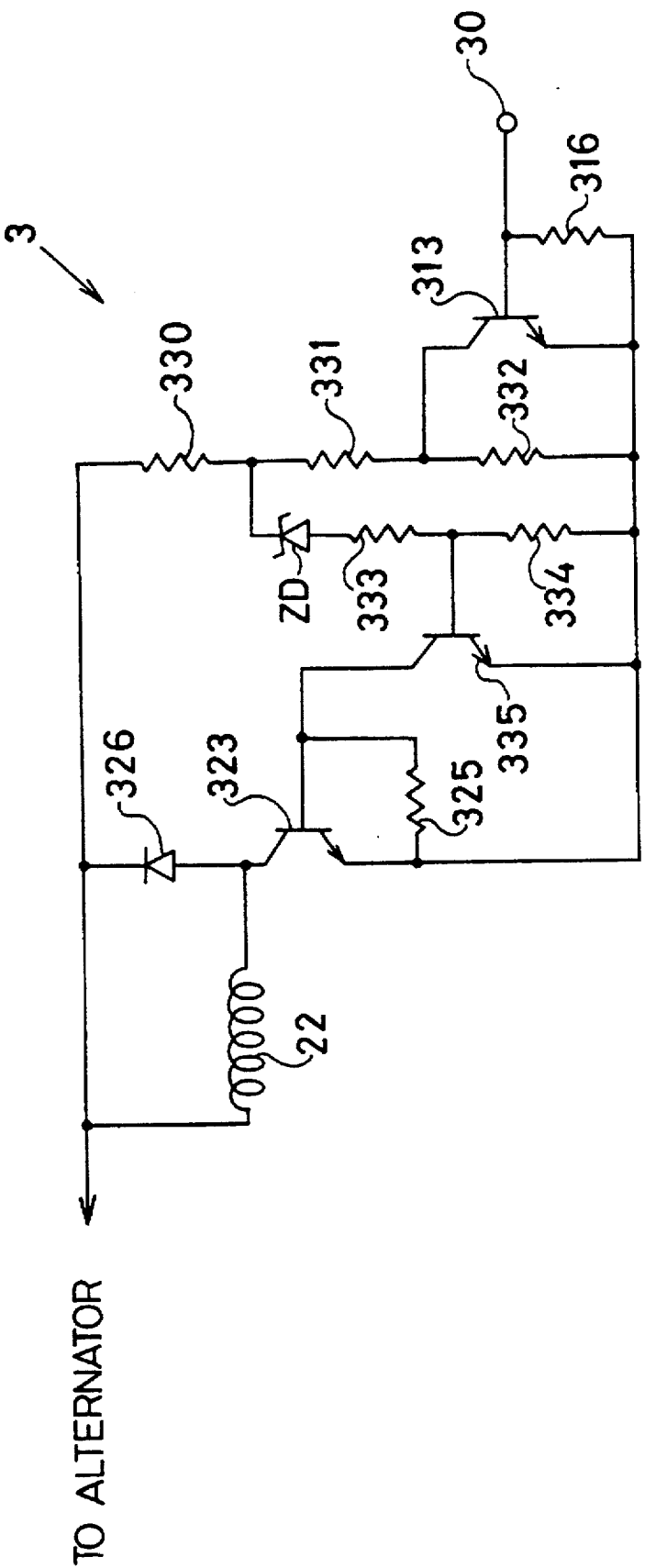
FIG. 8 is a portion of a circuit diagram of a generation control unit according to a fourth embodiment of the present invention.

A fourth embodiment of the present invention is described with reference to FIG. 8.

The control voltage in the generation control unit 3 of the above embodiment is changed in response to the command signal which is applied to the terminal 30. In the fourth embodiment, the alternator-voltage dividing ratio is changed by the transistor 313 according to the command signal.

A Zener diode ZD is connected to a junction of resistors 330 and 331. Thus, when the alternator output voltage increases and the divided voltage increases, the Zener diode ZD allows current to flow through the resistors 333 and 334, thereby turning on the transistor 335 and turning off the transistor 323, so that the field current is reduced. When, on the other hand, the alternator output voltage lowers, the transistor 335 turns off and the transistor 323 turns on to increase the field current.

A fifth embodiment is described with reference to FIG. 9, FIG. 10 and FIG. 11.

In the fifth embodiment, a pulse signal having a fixed duty ratio is used as the command signal of the upper control unit 4. The pulse signal is applied in order to generate the high voltage VHi by the alternator 2, and is stopped in order to generate the low voltage VLo.

Figure 9:
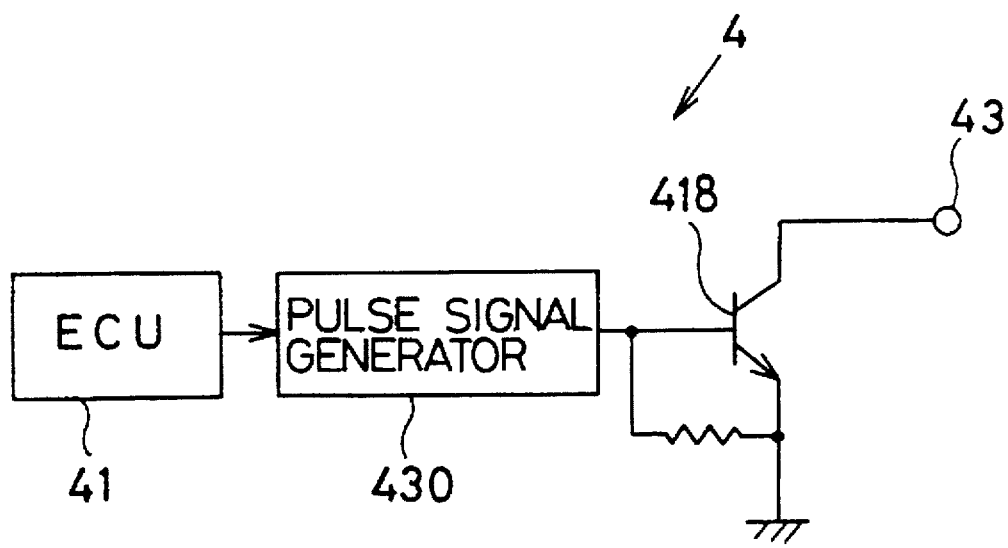
FIG. 9 is a portion of a circuit diagram of an upper control unit according to a fifth embodiment of the present invention.
Figure 10:
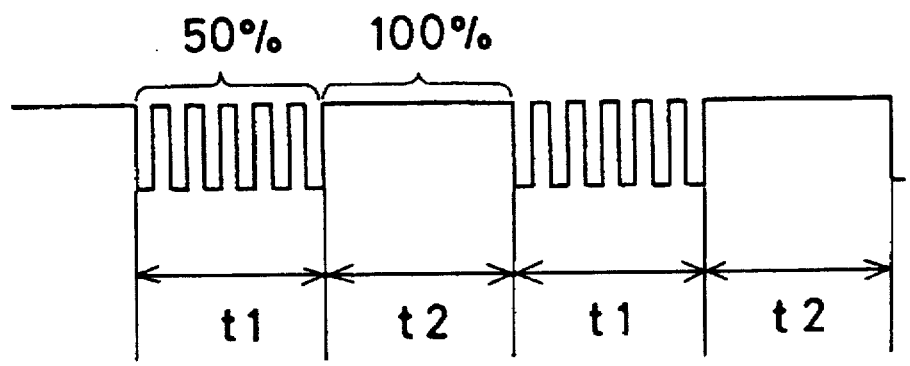
FIG. 10 is a time chart showing a command signal generated according to the fifth embodiment of the present invention.

A pulse signal generator 430 is provided in the upper control unit 4 as shown in FIG. 9. The pulse signal generator 430 generates the pulse signal of a fixed duty ratio (e.g. 50%) when the HI-level signal is applied thereto by the ECU 41 and stops generation of the pulse signal when the Lo-level signal is applied thereto. The pulse signal or a Hi-level signal of 100% duty ratio is applied, as the command signal, to the generation control terminal 43 through the transistor 418 in order to generate either the high voltage VHi or the low voltage VLo. The time ratio r between the pulse signal and the Hi-level signal is set according to the middle voltage Vm as shown in FIG. 10 in order to generate the middle voltage Vm.

Figure 11:
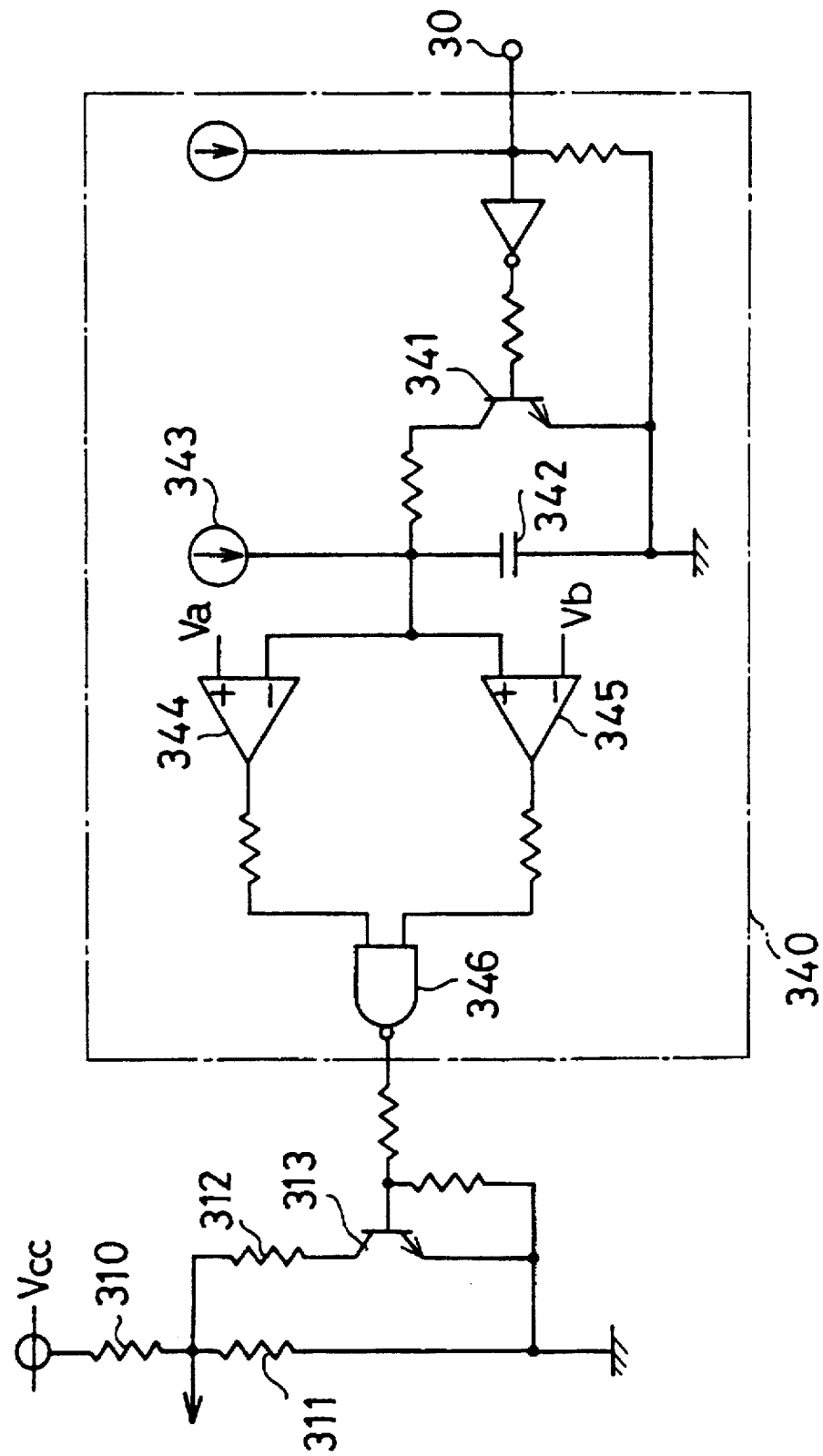
FIG. 11 is a portion of a circuit diagram of a generation control unit according to the fifth embodiment of the present invention.

As shown in FIG. 11, the generation control unit 3 has a duty ratio detecting circuit 340 for detecting duty ratio between the terminal 30 and the transistor 313.

The duty ratio detecting circuit 340 turns on a transistor 341 to discharge a capacitor 342 in response to the command signal applied to the terminal 30. Voltage of the capacitor 342 is set so that the capacitor voltage becomes V0 due to the difference between the electric charge supplied from a constant current source 343 and the electric charge discharged through the transistor 341 when the duty ratio of the input signal is 50%.

Reference voltage Va of a comparator 344 corresponds to the voltage of the capacitor 342 at a 60%-duty ratio, and reference Vb corresponds to the voltage of the capacitor 342 at a 40%-duty ratio, that is, Va>V0>Vb. A NAND circuit 346 is connected to the subsequent stage of the comparators 344 and 345.

As a result, when the pulse signal of the 50%-duty ratio is applied to the terminal 30, the output signal of the NAND circuit 346 becomes Lo-level to turn off the transistor 313, since the duty ratio is between 40% and 60%, thereby generating the first control voltage V1 to generate the high voltage VHi. On the other hand, when the pulse signal of the other duty ratio or other voltage signal is applied to the terminal 30, the voltage of the NAND circuit 346 becomes Hi-level to turn on the transistor 313, thereby generating the second voltage V2 to control the alternator 2 to generate the low voltage VLo.

Since, in this embodiment, the control voltage is changed according to whether a fixed duty ratio is detected or not, the operation is not affected by change of impedance of the communication line 7 connected to the terminal 30, that is, the operation is reliable.

Figure 12:
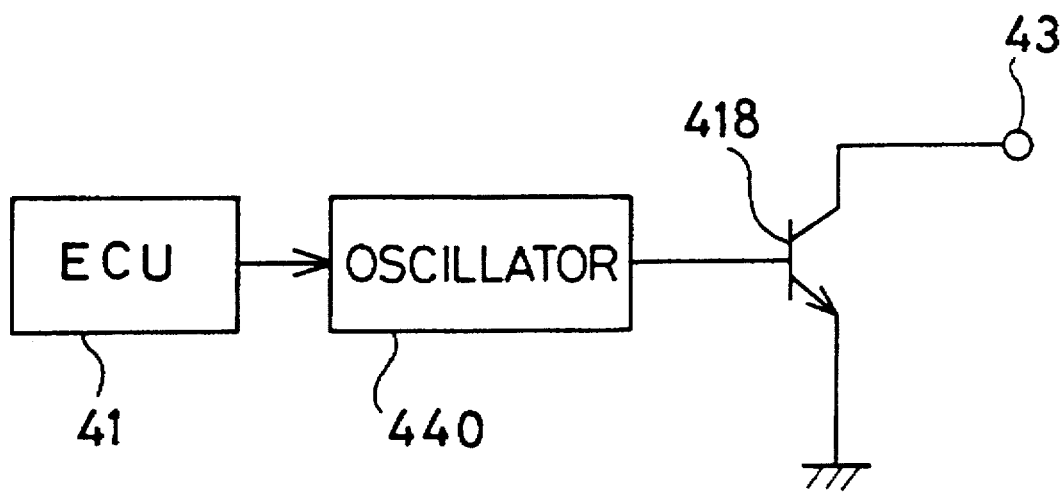
FIG. 12 is a portion of a circuit diagram of an upper control unit according to a sixth embodiment of the present invention.
Figure 13:
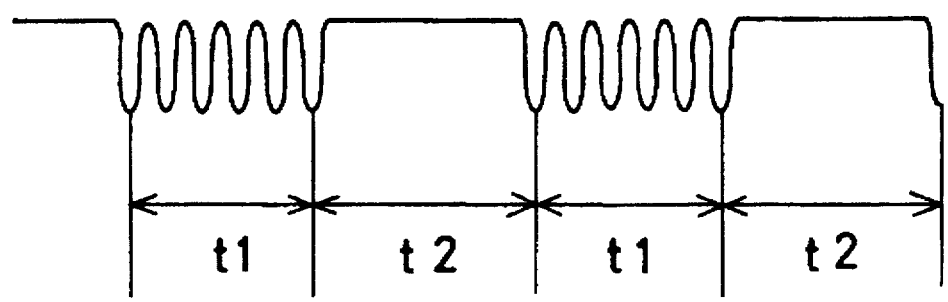
FIG. 13 is a time chart showing a command signal generated according to the sixth embodiment of the present invention.
Figure 14:
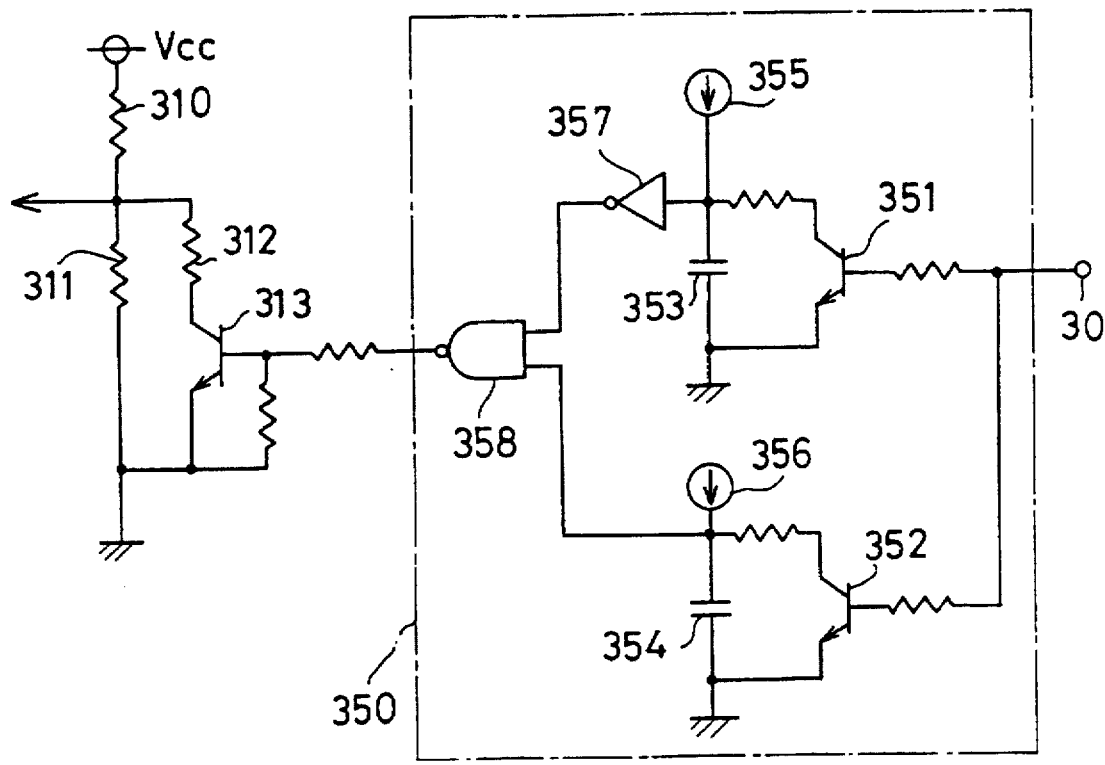
FIG. 14 is a portion of a circuit diagram of a generation control unit according to the sixth embodiment of the present invention.

A sixth embodiment is described with reference to FIG. 12, FIG. 13 and FIG. 14.

In the sixth embodiment, an AC signal of a fixed frequency is used as the command signal. The AC signal is applied so that the high voltage VHi is generated by the alternator 2, and is stopped so that the low voltage VLo is generated.

In the upper control unit 4, an oscillator 440 is provided to generate the AC signal at a fixed frequency (e.g. 100 Hz) when the Hi-level signal is applied to the subsequent stage of the ECU 41, and to stop generation when the Lo-level signal is applied thereto. The AC signal or the Hi-level signal, as the command signal, is applied to the generation control terminal 30 through the transistor 418 to generate either the high voltage VHi or the low voltage VLo. The time ratio r between the AC signal and the Hi-level signal is set according to the middle voltage Vm as shown in FIG. 13 in order to generate the middle voltage Vm.

The generation control unit 3 has a frequency detecting circuit 350 for detecting fixed frequencies between the terminal 30 and the transistor 313. In the frequency detecting circuit 350, transistors 353 and 354 discharge capacitors 353 and 354 in response to the signal applied to the terminal 30.

The capacity of the capacitor 353 and the current supplied by a constant current source 355 is set so that the voltage of the capacitor 353 becomes higher than the threshold voltage of an inverter 357 at a subsequent stage due to a difference between an electric charge supplied by the constant current source 355 and an electric charge discharged through the transistor 351 when the frequency of the command signal is higher than a reference frequency (e.g. 90 Hz) which is set in connection with a fixed frequency (e.g. 100 Hz). The capacity of the capacitor 354 and the current supplied by a constant current source 356 is set so that the voltage of the capacitor 354 becomes higher than the threshold voltage of the NAND circuit 358 at a subsequent stage due to a difference between an electric charge supplied by the constant current source 356 and an electric charge discharged through the transistor 352 when the frequency of the command signal is lower than a reference frequency (e.g. 110 Hz) which is set in connection with a fixed frequency (e.g. 100 Hz).

As a result, when the command signal of a fixed frequency (100 Hz) between 90 and 110 Hz is applied to the terminal 30, the output signal of the NAND circuit 358 becomes Lo-level to turn off the transistor 313, thereby generating the first control voltage v1 to control the alternator 2 to generate the high voltage VHi. On the other hand, when the command signal having a frequency other than the reference frequency or other signal is applied to the terminal 30, the voltage of the NAND circuit 358 becomes Hi-level to turn on the transistor 313, thereby generating the second control voltage v2 to generate the low voltage VLo.

Since, in this embodiment, the control voltage is changed according to whether a fixed frequency is detected or not, the operation is not affected by change of impedance of the communication line 7 connected to the terminal 30, that is, the operation is reliable.

Figure 15:
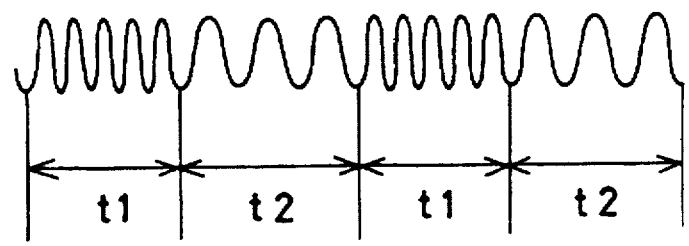
FIG. 15 is a time chart showing a command signal generated according to a variation of the sixth embodiment of the present invention.

Two frequency signals including the AC signal (e.g. 100 Hz and 200 Hz) which correspond respectively to the high voltage VHi and the low voltage VLo may be used as the command signal as shown in FIG. 15.

Figure 16:
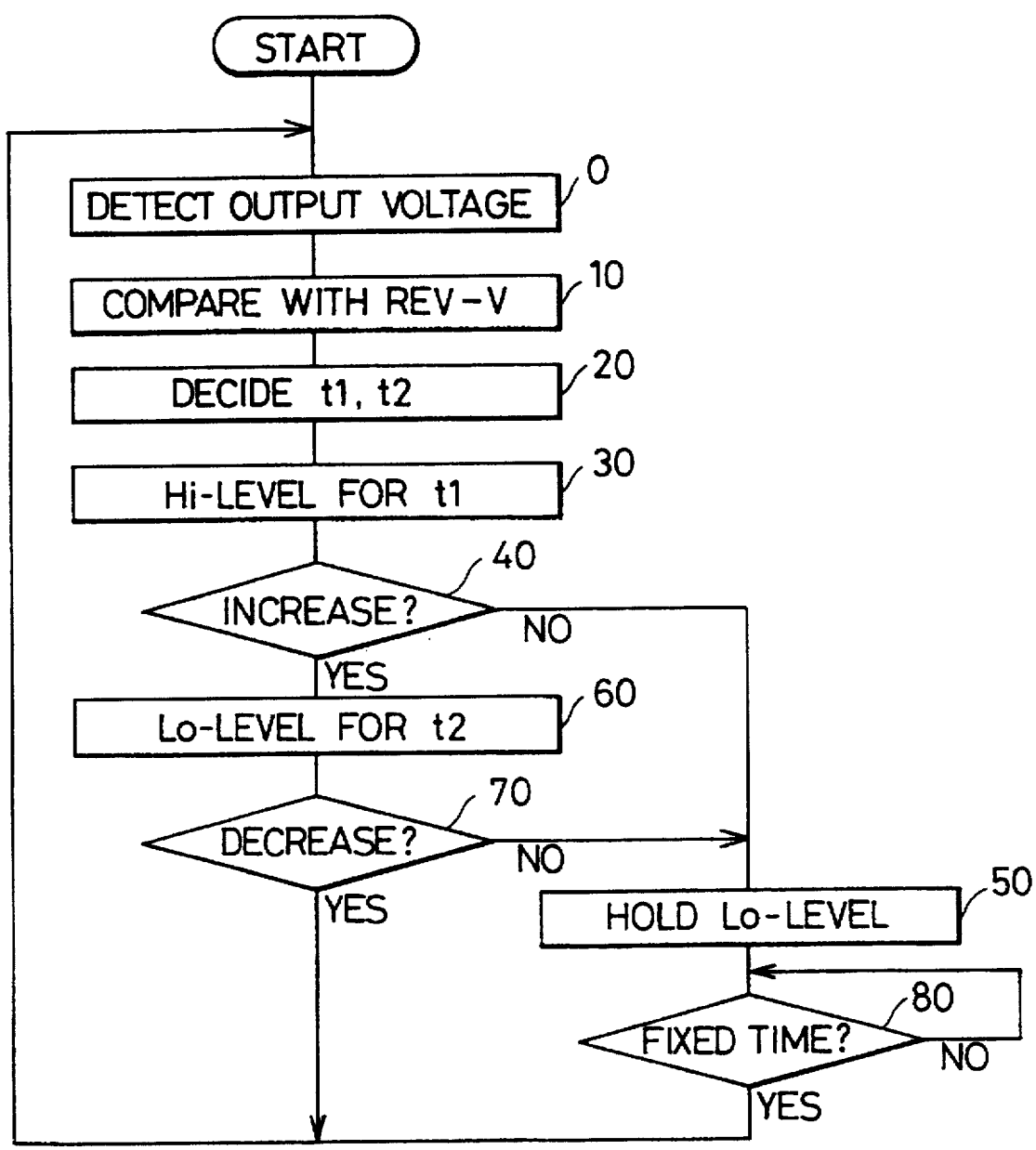
FIG. 16 is a flow chart of operation of an upper control unit of a seventh embodiment of the present invention.

A seventh embodiment is described with reference to FIG. 16.

In the seventh embodiment, whether the alternator output voltage changes in response to the command signal sent from the ECU 41 is checked. If the alternator output voltage does not change in response to the command signal, the alternator output voltage is fixed to the low voltage VLo.

The operation is described with reference to FIG. 16.

The output voltage of the alternator 2 is detected in a step 0, and the detected voltage is compared with a reference voltage corresponding to the middle voltage Vm in the ECU 41 in a step 10. On and off times t1 and t2 for the respective levels of the command signal are determined by a result of the comparison in a step 20. Subsequently, the ECU 41 generates Hi-level signal for the time t1 to provide the high voltage VHi in a step 30, and whether the alternator output voltage increases or not is detected in a step 40. If the increase is not detected (NO in the step 40), the output signal of the ECU 41 is fixed to the Lo-level which corresponds to the low voltage VLo in a step 50 since a transmission trouble such as disconnection of the communication line 7 shown in FIG. 1 or the like is assumed.

When an increase in the alternator output voltage is detected (YES in the step 40), the transmission of the command signal is assumed to be normal, and the ECU 41 generates the Lo-level signal for the time t2 to provide the low voltage VLo in a step 60. Then, whether the alternator output voltage is decreasing or not is detected in a step 70. When a decrease is not detected (NO in the step 70), transmission trouble is assumed and the output signal of the ECU 41 is fixed to the Lo-level which corresponds to the low voltage VLo in the step 50.

When the decrease of the alternator output voltage is detected (YES in the step 70), the operation is assumed to be normal and the Hi-level signal is generated for the time t1 after the step 20 to provide the high voltage VHi in the step 30, and the same steps are repeated thereafter.

On the other hand, when the alternator output voltage does not respond to the command signal and the step 50 follows, the process goes to the step 20 after a fixed time passed in a step 80, and the same control is carried out. Thus, if the transmission of the command signal fails due to a trouble of the communication line 7 such as disconnection by accident, normal operation can be restored when the trouble is dismissed.

Figure 17:
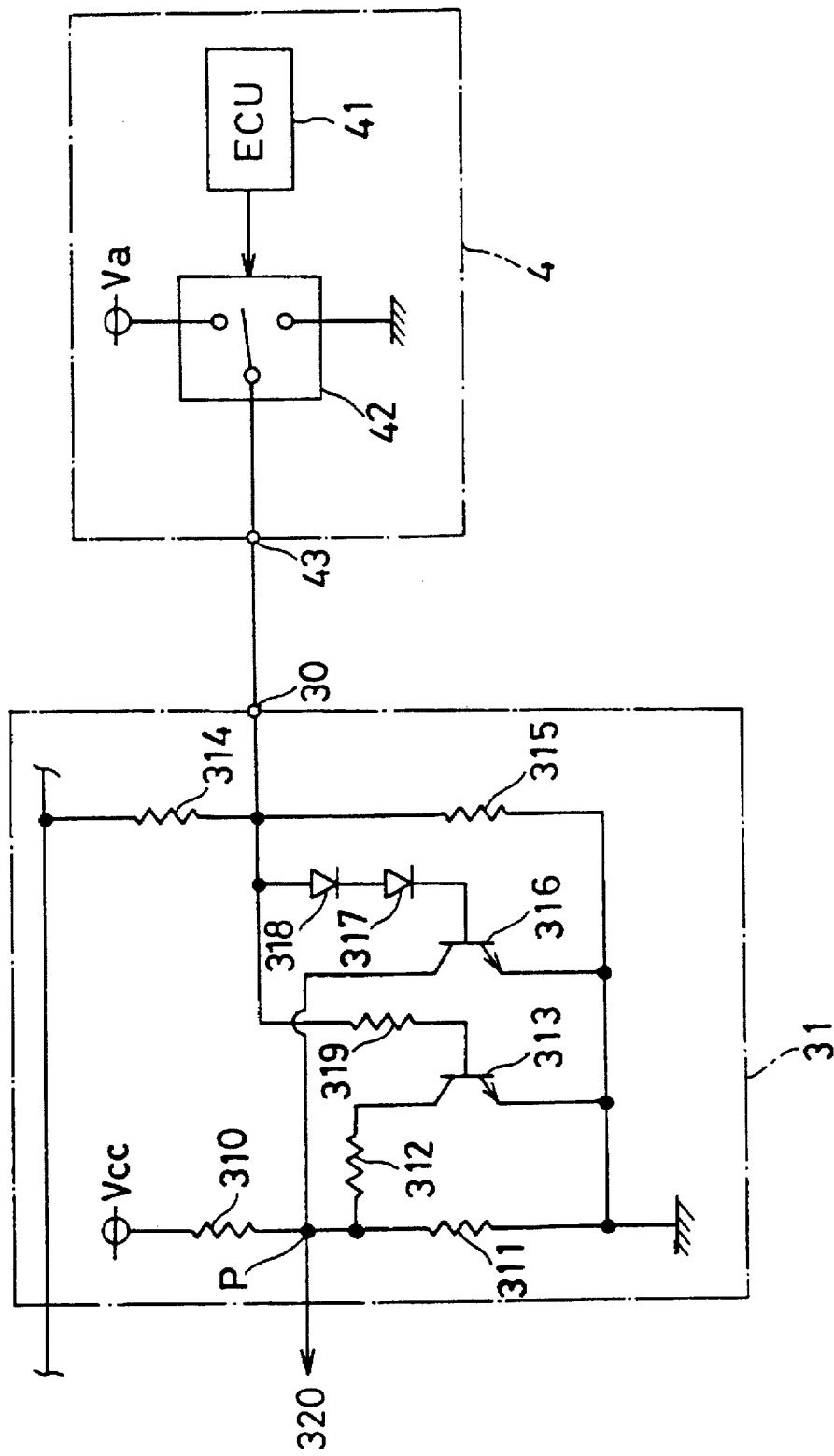
FIG. 17 is a portion of a circuit diagram of a generation control unit according to an eighth embodiment of the present invention.

An eighth embodiment of the present invention is described with reference to FIG. 17. The collector of a transistor 316 is connected to a control voltage terminal P of the control voltage setting circuit 31 and the base of the transistor 316 is connected to the terminal 30 through level shift diodes 317 and 318 in the eighth embodiment.

Characteristic operation of this embodiment is described below.

The voltage of the terminal 30 is set to a voltage (0.7 V–2.1 V) which corresponds to one to three diodes by the resistors 314 and 315. Therefore, when the switching element of the signal generating circuit 42 is in the open state, the transistor 313 is turned on and the transistor 316 is turned off, so that the positive terminal of the comparator 320 is set to the second control voltage v2.

When the switching element of the signal generating circuit 42 is grounded, the terminal 30 is also grounded and both transistors 313 and 316 are turned off, so that the positive terminal of the comparator 320 is set to the first control voltage v1.

When the switching element of the signal generating circuit 42 connects to the voltage source terminal, the voltage of the terminal 30 becomes the source voltage Va (about 5 V), which is higher than the voltage corresponding to the voltage drop across three series-connected diodes (not shown), to turn on the transistor 316. The voltage of the positive terminal of the comparator 320 becomes a voltage level (0.1 V) of the transistor 316 being on, which is low enough for the voltage regulation circuit 32 to turn off the transistor 323, thereby to cut the field current and stop the generation of the alternator 2.

Accordingly, when the vehicle is accelerated, the ECU 41 of the upper control unit 4 brings the switching element of the signal generating circuit 42 to the voltage source terminal, thereby stopping generation of the alternator 2. Thus, the generation torque can be reduced, thereby, to improve the vehicle acceleration performance.

The alternator output voltage can be controlled to be the middle voltage Vm between 0 V and 14.5 V if the switching element is switched over from one to the other between the open position and the voltage source terminal. For instance, if the middle voltage is set to 12.8 V (voltage across the battery terminals without connection), the alternator output voltage can be controlled on the basis of the voltage Vm which is the normal battery voltage, thereby improving vehicle fuel consumption because excessive generation is prevented.

Figure 18:
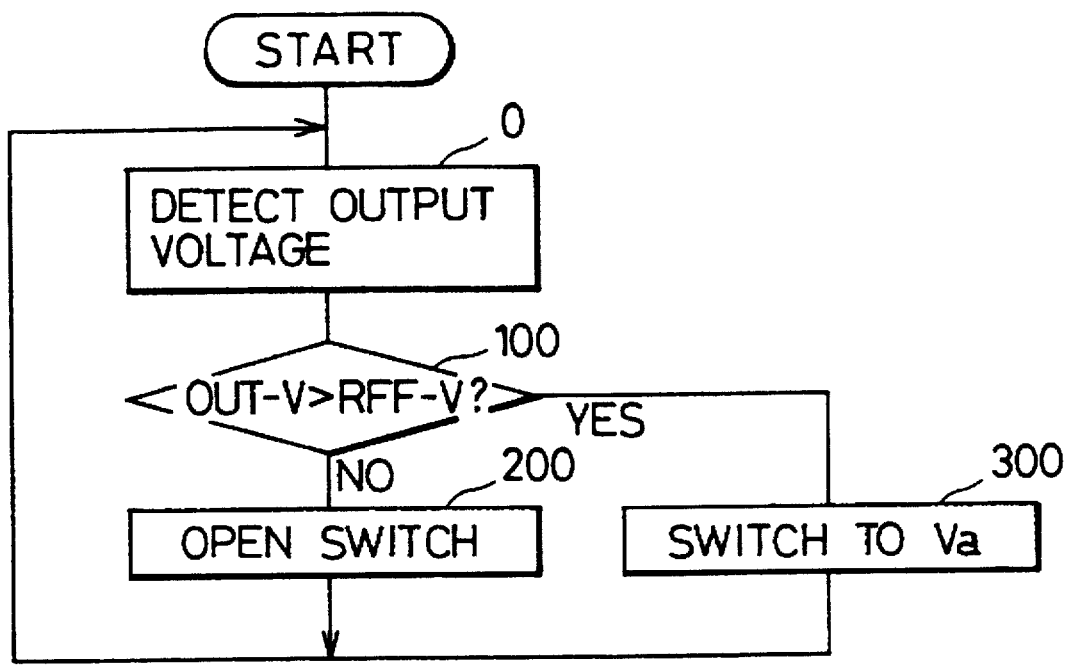
FIG. 18 is a flow chart of operation according to the eighth embodiment of the present invention.

The control steps of the ECU 41 to provide the middle voltage Vm by feedback control is described below with reference to a flow chart shown in FIG. 18.

The ECU 41 detects the output voltage of the alternator 2 in a step 0, and compares the output voltage with a reference voltage which corresponds to the middle voltage Vm in a step 100. If the output voltage is lower than the reference voltage (NO in the step 100), the switching element of the signal generating circuit 42 is made open in a step 200. Then, the alternator output voltage is set to 14.5 V and the alternator starts generation to increase the output voltage.

When the output voltage is higher than the reference voltage (YES in the step 100), the switching element of the signal generating circuit 42 is turned to connect to the voltage source terminal in a step 300. As a result, the alternator is set to stop generation.

The above feedback control is carried out in a cycle shorter than the cycle decided by the response time of the alternator so that the alternator output voltage can be controlled to the middle voltage.

Figure 19:
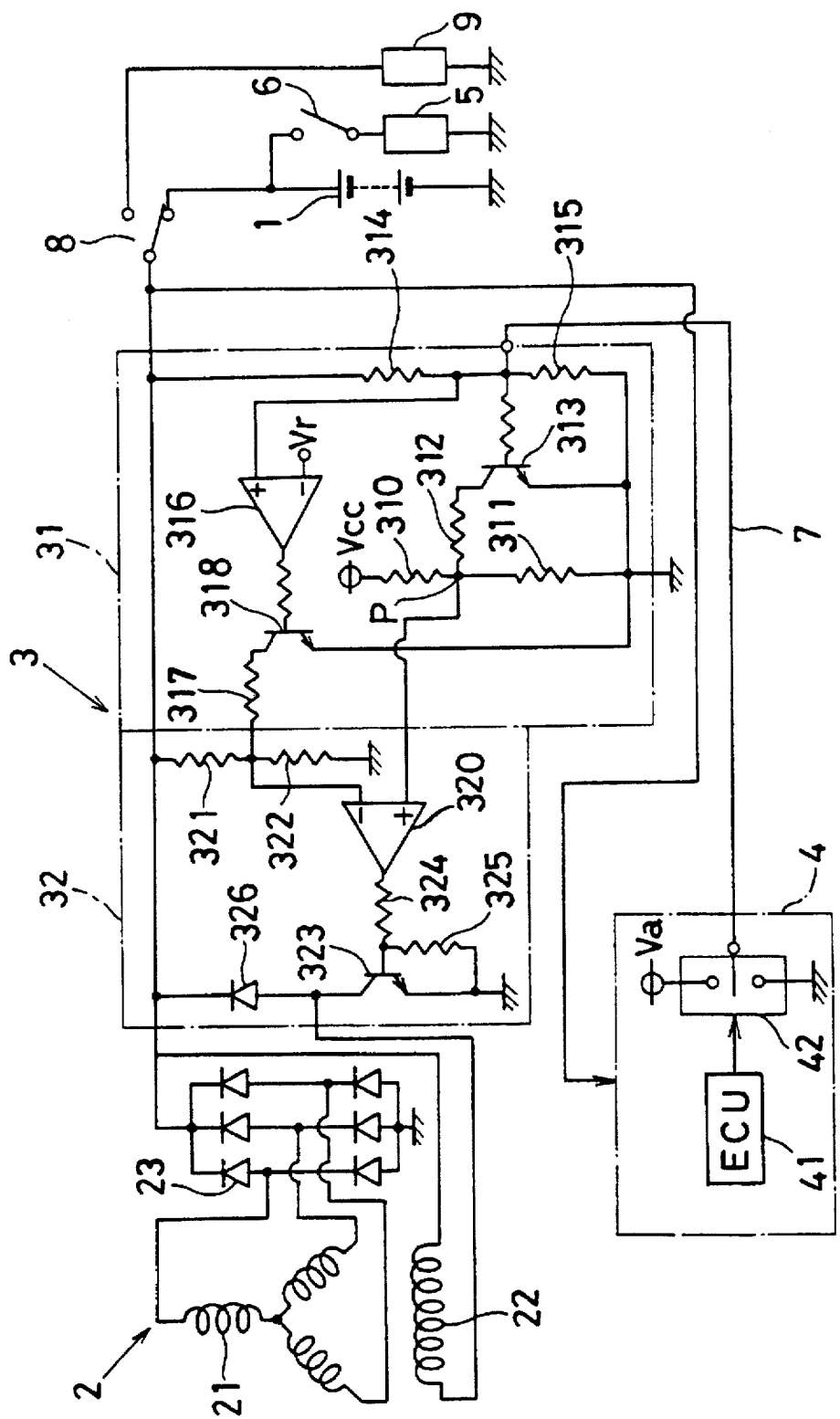
FIG. 19 is a circuit diagram of a voltage regulator and a vehicle alternator according to a ninth embodiment of the present invention.

A ninth embodiment of the present invention is described with reference to FIG. 19.

The ninth embodiment has a high power load (windshield heater) 9 added to the eighth embodiment and the control voltage setting circuit 31 is modified. A switch 8 supplies the alternator output power either to the battery or to the high power load 9. The upper control unit 4 is the same as that of the eighth embodiment and, therefore, description is omitted.

The control voltage setting circuit 31 has a resistor 317 and a transistor 318 which are connected to the junction of the resistors 321 and 322 which compose the voltage dividing circuit, so that the dividing ratio of the voltage dividing circuit is changed in response to on-off-operation of the transistor 318.

Output voltage of a comparator 316 is applied to the base of the transistor 318, and reference voltage Vr is applied to the negative terminal of the comparator 316 to detect the voltage of the terminal 30. The reference voltage Vr is higher than the voltage of the terminal 30 formed by the bias circuit 314 and 315 when the switching element of the signal generating circuit 42 of the upper control unit 4 is open, and lower than the voltage Va of the terminal 30 when the switching element of the signal generating circuit 42 is connected to the voltage source terminal.

Since the operation of the switching element of the signal generating circuit 42 is the same as the first embodiment, description is omitted.

In the ninth embodiment, when the switching element of the signal generating circuit 42 is connected to the voltage source terminal to use the windshield heater (which is the high power load), the voltage of the terminal 30 becomes Va and the output of the comparator 316 becomes Hi-level. As a result, the transistor 318 turns on and the dividing ratio of the voltage dividing circuit becomes such a ratio corresponding to a high voltage (e.g. 30 V) to be supplied to the high power load.

As a result, the alternator 2 generates 30V-output power for the high power load. The switching element is changed over from one to the other between the open position and the voltage source terminal according to temperature of the high power load or outside temperature in the same process shown in FIG. 18, so that the alternator output voltage is controlled between 30 V and 14.5 V. As a result, excessive heating of the windshield heater can be prevented and the output power of the alternator 2 can be saved when the outside is not very cold, resulting in improvement of the fuel consumption.

As described above, the present invention provides feedback control which generates a third voltage between the first output voltage and the second output voltage by alternately changing two control voltages to generate two output voltages, so that the control voltage setting circuit 31 is only required to discriminate the limited number of command signals transmitted from the upper control unit 4. As a result, the discriminating circuit can be made simple and inexpensive.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A voltage regulator of a vehicle alternator driven by a vehicle engine comprising:

means for setting a first control voltage when a first command signal which corresponds to a first desired output voltage of said alternator is transmitted and a second control voltage when a second command signal which corresponds to a second desired output voltage of said alternator is transmitted;

means, having a first alternator-output-voltage sensor disposed in said alternator, for on-off-controlling field current of said alternator according to control voltages including said first and second control voltages thereby to regulate an actual alternator output voltage to desired output voltages corresponding to command signals including said first and second command signals; and means, disposed outside said alternator and connected to said control voltage setting means, for generating command signals including said first command signal which corresponds to said first desired output voltage of said alternator and said second command signal which corresponds to said second desired output voltage of said alternator;

wherein said command signal generating means comprises:

means for setting a reference voltage which corresponds to a middle desired output voltage between said first desired output voltage and said second desired output voltage;

a second-alternator-output-voltage sensor; and means for comparing said actual alternator output voltage with said reference voltage and for alternately switching between transmitting said first command signal and said second command signal to provide a middle command signal corresponding to said middle desired output voltage.

2. A voltage regulator of a vehicle alternator driven by a vehicle engine comprising:

means for setting a first control voltage when a first command signal which corresponds to a first desired output voltage of said alternator is transmitted and a second control voltage when a second command signal which corresponds to a second desired output voltage of said alternator is transmitted;

means, having a first alternator-output-voltage sensor disposed in said alternator, for on-off-controlling field current of said alternator according to control voltages including said first and second control voltages thereby to regulate an actual alternator output voltage to desired output voltages corresponding to command signals including said first and second command signals; and means, disposed outside said alternator and connected to said control voltage setting means, for generating command signals including said first command signal which corresponds to said first desired output voltage of said alternator and said second command signal which corresponds to said second desired output voltage of said alternator, said command signal generating means providing voltage or current signals as said command signals;

wherein said command signal generating means comprises:

means for setting a reference voltage which corresponds to a middle desired output voltage between said first desired output voltage and said second desired output voltage;

a second-alternator-output-voltage sensor; and means for comparing said actual alternator output voltage with said reference voltage and for alternately switching between transmitting said first command signal and said second command signal to provide a middle command signal corresponding to said middle desired output voltage.

3. A voltage regulator of a vehicle alternator as claimed in claim 2, wherein a switching cycle of said comparing means is set shorter than a response time of said vehicle alternator.

4. A voltage regulator of a vehicle alternator as claimed in claim 3, wherein said switching cycle of said comparing means is set to a constant cycle shorter than said response time.

5. A voltage regulator of a vehicle alternator as claimed in claim 2, wherein said comparing means adjusts a switching ratio between time periods said first and second command signals are transmitted to regulate said actual alternator output voltage.

6. A voltage regulator of a vehicle alternator as claimed in claim 5, wherein said comparing means adjusts said switching ratio step by step.

7. A voltage regulator of a vehicle alternator as claimed in claim 2, wherein said first control voltage and said second control voltage are set so that a vehicle battery does not discharge beyond a predetermined level.

8. A voltage regulator of a vehicle alternator, comprising:

means for setting a first control voltage when a first command signal which corresponds to a first desired output voltage of said alternator is transmitted and a second control voltage when a second command signal which corresponds to a second desired output voltage of said alternator is transmitted;

means, having a first alternator-output-voltage sensor disposed in said alternator, for on-off-controlling field current of said alternator according to control voltages including said first and second control voltages thereby to regulate an actual alternator output voltage to desired output voltages corresponding to command signals including said first and second command signals; and means, disposed outside said alternator and connected to said control voltage setting means, for generating command signals including said first command signal which corresponds to said first desired output voltage of said alternator and said second command signal which corresponds to said second desired output voltage of said alternator;

wherein said command signal generating means comprises:

means for setting a reference voltage which corresponds to a middle desired output voltage between said first desired output voltage and said second desired output voltage;

a second-alternator-output-voltage sensor;

means for comparing said actual alternator output voltage with said reference voltage and for alternately switching between transmitting said first command signal and said second command signal to provide a middle command signal corresponding to said middle desired output voltage;

means for detecting abnormality of said actual alternator output voltage detected by said second-alternator-output-voltage sensor; and means for preventing transmission of one of said command signals which corresponds to a predetermined one of said control voltages when said detected actual alternator output voltage is abnormal.

9. A voltage regulator of a vehicle alternator as claimed in claim 8, wherein said command signal generating means provides one of said command signals which corresponds to a predetermined one of said control voltages to cause said alternator to generate a self-controlled output voltage when said actual alternator output voltage is abnormal.

10. A voltage regulator of a vehicle alternator driven by a vehicle engine including:

means for setting one of first, second and third control voltages when one of a first command signal which corresponds to a first desired alternator output voltage, a second command signal which corresponds to a second desired alternator output voltage and a third command signal which corresponds to a third desired alternator output voltage is transmitted from outside;

means having a first alternator-output-voltage sensor for regulating an actual alternator output voltage to one of said first, second and third desired alternator output voltages by on-off controlling field current of said alternator according to one of said control voltages; and means disposed outside said alternator for generating said first, second and third command signals;

wherein said command signal generating means comprises:

means for setting reference voltages corresponding to middle desired output voltages between two of said first, second and third desired alternator output voltages;

a second alternator-output-voltage sensor connected to said alternator;

means for comparing said actual alternator output voltage with one of said reference voltages; and means for alternately switching between transmitting said two of said first, second and third command signals corresponding to one of said middle desired output voltages.

11. A voltage regulator of a vehicle alternator as claimed in claim 10, wherein said third control voltage set by said control voltage setting means stops an electrical generation operation of said alternator.

12. A voltage regulator of a vehicle alternator as claimed in claim 10, wherein said third control voltage set by said control voltage setting means causes said alternator to generate a high output voltage which is supplied to a high power load other than said battery.

13. A voltage regulator of an alternator driven by a vehicle engine comprising:

means for setting control voltages which regulate an actual alternator output voltage to one of first and second desired alternator output voltages which correspond respectively to first and second command signals transmitted from outside;

means having an internal alternator-output-voltage sensor for regulating said actual alternator output voltage by on-off controlling field current of said alternator according to said control voltages; and means for generating said first and second command signals and a third command signal, said third command signal being formed by alternately switching between transmitting said first and second command signals;

whereby said control voltage setting means alternately selects said first control voltage and said second control voltage according to said third command signal so that said actual alternator output voltage becomes a middle desired voltage between said first and second desired alternator output voltages.

14. A voltage regulator of a vehicle alternator driven by a vehicle engine comprising:

means for setting one of a plurality of control voltages when one of a plurality of command signals respectively corresponding to a plurality of desired alternator output voltages is applied thereto;

means, having a first alternator-output-voltage sensor and disposed in said alternator, for on-off-controlling field current of said alternator according to one of said control voltages thereby to regulate an actual alternator output voltage to one of said desired alternator output voltages corresponding to one of said command signals; and means, disposed outside said alternator and connected to said control voltage setting means, for generating said command signals;

wherein said command signal generating means comprises:

means for setting a reference voltage which corresponds to a middle desired output voltage between one and another of said desired alternator output voltages;

a second-alternator-output-voltage sensor connected to said alternator;

means for comparing said actual alternator output voltage with said reference voltage; and means, connected to said control setting means, for alternately switching between transmitting said one and another of said command signals respectively corresponding to said one and another of said desired alternator output voltages at a cycle greater than that to which said actual alternator output voltage can respond when said middle output voltage is required.

15. A voltage regulator for a vehicle alternator having a field coil and an armature winding, said alternator being capable of generating an actual alternator output voltage including a high output voltage and a low output voltage, said voltage regulator comprising:

first means, having an input terminal, for setting a first control voltage when a command signal higher than a threshold level of said input terminal is applied to said input terminal, and for setting a second control voltage when a command signal lower than said threshold level is applied to said input terminal;

a first circuit, having a voltage sensor connected to said armature winding and a comparator connected to said first means and said voltage sensor, for providing an output signal according to a comparison between said actual alternator output voltage and said first and second control voltages;

a switch, connected to said first circuit, for on-off-controlling field current of said alternator according to said output signal to thereby regulate said alternator output voltage to one of said high output voltage and said low output voltage; and second means, connected to said input terminal of said first means, for generating said command signals, said second means including a second circuit for alternately switching between transmitting said first command signal and said second command signal at a cycle which is too high for said field current to follow and with a duty ratio which corresponds to a vehicle condition, thereby regulating said alternator output voltage to a middle output voltage which is between said high output voltage and said low output voltage.

16. A voltage regulator of a vehicle alternator as claimed in claim 15, wherein said second circuit further includes:

a setting circuit for setting a reference voltage which corresponds to said vehicle condition; and a comparator, connected to said setting circuit, for comparing said actual alternator output voltage with said reference voltage.

17. A voltage regulator of a vehicle alternator as claimed in claim 15, wherein said second means further includes:

a detecting circuit for detecting an abnormality of said actual alternator output voltage; and a holding circuit for preventing transmission of one of said command signals which corresponds to a predetermined one of said control voltages when said detected actual alternator voltage is abnormal.

18. A voltage regulator of a vehicle alternator as claimed in claim 15, wherein said command signals provided by said second means are one of a voltage signal and a current signal.

19. A voltage regulator for an alternator driven by a vehicle engine, said alternator providing an actual output voltage in correspondence with a field current applied to an armature winding thereof, said voltage regulator comprising:

a voltage regulation circuit coupled to said alternator that adjusts said field current in accordance with a comparison between said actual output voltage and a supplied control voltage;

a control voltage setting circuit coupled to said voltage regulation circuit that adjusts a voltage level of said supplied control voltage between a first and second control voltage in response to a first and second command signal, respectively; and an upper control unit that generates said first and second command signals, said upper control unit causing said first command signal to be transmitted to said control voltage setting circuit so that said actual alternator output voltage becomes a high output voltage within an alternator response time, said upper control unit causing said second command signal to be transmitted to said voltage setting circuit so that said actual alternator output voltage becomes a low output voltage within said alternator response time, said upper control unit switching between transmitting said first command signal and said second command signal at a cycle rate less than said alternator response time so that said actual alternator output voltage becomes a middle output voltage between said high and low output voltages.

* * * * *